Figure 1A:
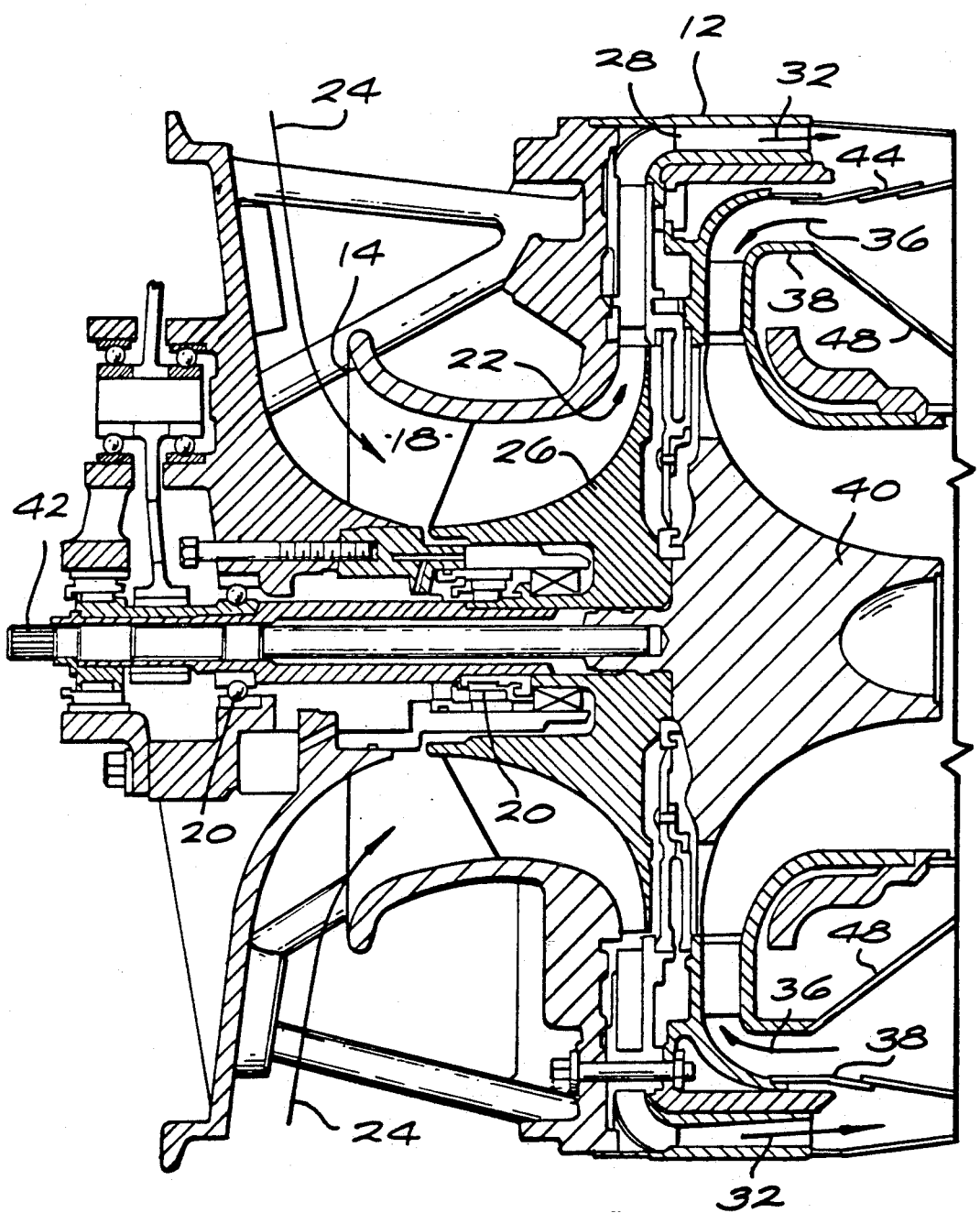

United States Patent [19]

Haasis

[11] Patent Number: 5,109,671
[45] Date of Patent: May 5, 1992

[54] COMBUSTION APPARATUS AND METHOD FOR A TURBINE ENGINE

[75] Inventor: John M. Haasis, Carlsbad, Calif.

[73] Assignee: Allied-Signal Inc., Morris Township, Morris County, N.J.

[21] Appl. No.: 446,233

[22] Filed: Dec. 5, 1989

[51] Int. Cl.⁵ ............................................. F02C 3/05
[52] U.S. Cl. ..................................... 60/39.36; 60/757; 60/760
[58] Field of Search ............... 60/39.36, 755, 757, 60/732, 733, 760

[56] References Cited

U.S. PATENT DOCUMENTS

| | | |
|---|---|---|
| 2,601,000 | 6/1952 | Nerad . |
| 2,687,010 | 8/1954 | Ellis . |
| 2,977,760 | 4/1961 | Soltau et al. ............... 60/39.36 |
| 3,088,279 | 5/1963 | Diedrich ..................... 60/39.36 |
| 3,287,905 | 11/1966 | Bayard ........................ 60/39.36 |
| 3,333,414 | 8/1967 | Saintsbury . |
| 3,512,359 | 5/1970 | Pierce . |
| 3,593,518 | 7/1971 | Gerrard . |
| 3,613,360 | 10/1971 | Howes ......................... 60/755 |
| 3,645,095 | 2/1972 | Melconian ................. 60/39.36 |
| 3,671,171 | 6/1972 | Doyle . |
| 3,691,766 | 9/1972 | Champion ..................... 60/760 |
| 3,869,864 | 3/1975 | Bunn ............................ 60/39.36 |
| 3,968,644 | 7/1976 | Fehler . |
| 4,151,709 | 5/1979 | Melconian et al. ......... 60/39.36 |
| 4,891,936 | 1/1990 | Shekleton et al. ............ 60/755 |
| 4,928,479 | 5/1990 | Shekleton et al. ............ 60/755 |

FOREIGN PATENT DOCUMENTS

| | | |
|---|---|---|
| 2203023 | 5/1974 | France . |
| PCT/US88/-04582 | 7/1989 | PCT Int'l Appl. ............ 60/39.36 |
| 588086 | 3/1944 | United Kingdom . |
| 1571213 | 7/1980 | United Kingdom . |

Primary Examiner—Richard A. Bertsch
Assistant Examiner—Timothy S. Thorpe
Attorney, Agent, or Firm—Terry L. Miller; James W. McFarland; Robert A. Walsh

[57] ABSTRACT

A combustion structure for a turbine engine includes an annular combustion cavity into which flows a part of each of a plurality of radially outwardly flowing primary air jets to define a rotating toroid of primary combustion air. Plural annular louvers defined in the walls of the combustion cavity provide plural film-like wall cooling air flows moving in agreement with the rotating toroid of primary combustion air. An annular array of circumferentially spaced apart and disposed louvers in a radially outer wall of the combustor structure provide film-like air flows to energize the rotating toroid of combustion air to swirl about the combustion cavity.

17 Claims, 3 Drawing Sheets

COMBUSTION APPARATUS AND METHOD FOR A TURBINE ENGINE

The present invention is in the field of combustion apparatus and methods for turbine engines. More particularly, the present invention provides an annular combustor structure for use in a comparatively small turbine engine of the aerospace type. By way of example only, the combustor of the present invention may advantageously find application to turbine propulsion engines of the turboprop, turbojet, turbofan, and turboshaft categories. These propulsion engines, as well as auxiliary power unit (APU) aerospace turbine engines are characterized by comparatively small physical size and a high horsepower output in comparison to their size and weight. Consequently, these aerospace turbine engines require a combustion apparatus and method of high energy release in a comparatively small combustor volume.

Because of the high energy release in the combustor of a high performance turbine engine, the exhaust products are generally at or above a temperature sufficient to cause physical degradation or melting of the combustor structure. Thus, cooling of parts of the combustor structure must be provided. Here too, however, care must be exercised because a degree of cooling sufficient to preserve the combustor at maximum energy release and temperature of exhaust products may at lower power levels result in over cooling and quenching of the combustion reaction. This over cooling and combustion quenching can cause carbon fouling at lower power levels. Experience in the turbine engine art has shown that some combustors are prone to carbon fouling, while other designs are not so likely to experience this problem.

Another consideration for the designer of a high performance turbine engine is the uniformity of temperature within the combustion products flowing from the combustor. A nearly perfect uniformity of temperature of these combustion products is desired in order to avoid overheating any portion of the turbine. Because the power output of a turbine engine generally is limited by the temperature endurance of the turbine, and the hottest part of the turbine is the limiting factor, the achievement of uniform temperature in the combustion products and turbine allows an improved engine performance. A combustor having nearly uniform temperature of combustion products is said to have a low pattern factor. Unfortunately, the combustor design features which result in low carbon fouling sometimes result in a higher pattern factor. The same is true with respect to low pattern factor design features sometimes resulting in increased carbon fouling.

Yet another combustor design feature which has an easily appreciated influence on carbon fouling and pattern factor is the number of fuel injectors employed to deliver fuel to the combustor. The use of only a single fuel injection nozzle has easily appreciated advantages for low cost and simplicity of the engine. Indeed, some conventional turbine engines employ only a single fuel injection nozzle, which is generally disposed at one end of a single elongate cylindrical combustor. This "can type" combustor has enjoyed wide popularity in the smaller sizes of turbine engines. Unfortunately, a can type combustor imposes undesirable penalties of size, weight, and engine configuration on the turbine engine. As a result, many high performance turbine engines employ an annular combustor in which the combustor encircles the central shaft of the engine.

In view of the above, it is easily appreciated that while a conventional annular combustor requires plural fuel injection nozzles, designers are continually striving to reduce the number of these nozzles while preserving a low pattern factor and freedom from carbon fouling. A factor which goes hand-in-hand with a reduced number of fuel injection nozzles is an increased size of the metering orifices in each nozzle. Because smaller orifices are both more expensive to precisely manufacture and more prone to clogging than are larger orifices, a decrease in the number of fuel injection nozzles required reduces engine costs and improves reliability.

In attempts to realize the most favorable combination of the above factors a number of varied conventional annular combustor structures and methods have been developed. Salient along these combustors is the use of high intensity recirculation primary combustion air flow within the combustor. Representative of a group of conventional combustors employing a combustion air flow known generally as double-sided recirculation flow is the combustor of Adolf Fehler U.S. Pat. No. 3,968,644, issued Jul. 13 1976 (hereinafter the '644 patent). The primary or combustion air entering the annular combustor of the '644 patent enters via pairs of radially opposed ports defined by the radially inner and radially outer walls of the combustor. These ports direct opposed jets of pressurized air radially toward the center of the combustor where impingement of the jets results in formation of oppositely circulating vortices. These vortices are disposed in an arcuate combustor dome part of the combustor to provide a combustion zone of swirling air/fuel mixing. Of course, not all of the primary air enters into the combustor dome vortices, and the vortices are somewhat localized. That is, the strength of the vortices are expected to be of greatest strength at the alignment of the radial ports and of lesser strength intermediate the radial ports. Intermediate of the radial ports, trains of oppositely circulating vortices are expected to flow downstream toward the outlet of the combustor. This latter flow phenomena is easily appreciated by considering the teaching of Jerry O. Melconian U.S. Pat. No. 3,645,095, issued Nov. 25, 1970, (hereinafter, the '095 patent).

In view of the teaching of the '644, and '095 patents, it is easily appreciated that conventional annular combustors of double-sided recirculation flow design may be expected to perform circumferentially nonuniform combustion. That is, the air flow mixing intensity and combustion product temperature will not be consistent at the combustion dome region around the circumference of the combustor. The combustion designer must attempt to correct this circumferential nonuniformity with dilution and wall cooling air flows prior to the combustor exit or an increased pattern factor will result. Inevitably, these attempts to achieve circumferential uniformity of exhaust products from a combustion process which itself is not uniform circumferentially are fraught with compromise and unsatisfactory results. A risk of localized overcooling which may result from this attempt to achieve circumferential uniformity is carbon fouling.

An alternative combustor design is exemplified by Keith H. Champion U.S. Pat. No. 3,691,766, issued Sept. 19, 1972, (hereinafter, the '766 patent). According to the teaching of the '766 patent an annular combustor includes a pair of axially extending radially spaced annular walls which are interconnected by an arcuate radially extending annular dome wall. The walls cooperatively define a plurality of louvers disposed to provide an axially and radially inwardly directed cooling film flowing along the outer wall across the inside surface of the dome wall and to the radially inner wall. The radially inner wall defines a nozzle directed radially toward the radially outer wall, and through which issues a jet of pressurized primary combustion air. This pressurized air jet impinges generally perpendicularly upon the outer wall and provides a torus of air rotating in the same direction as the film cooling air. Into this rotating torus of air a plurality of fuel injection nozzles deliver a flow of fuel to maintain combustion. This flow of fuel is generally delivered axially in a direction consistent with the direction of rotation of the toroidal air flow near the combustor dome. Downstream of the primary combustion zone, the '766 teaching introduces axially flowing cooling films, as well as radially flowing dilution air jets. Again, because of the singular location of each of the plurality of circumferentially spaced apart fuel injection nozzles, combustion is believed to not be circumferentially uniform. Similarly, to the '644 patent, the teaching of the '766 patent also provides a vortex or toroid air flow which is energized at each of the radially directed primary air jets. Intermediate of these air jets, the toroid flow may be expected to be less energetic, and to provide an air/fuel mixing action which is also not uniform circumferentially.

A further consideration in the design of a combustion system for a high performance aerospace turbine engine is the swirling pressurized air flow originating from the dynamic compressor section of the engine. In order to provide an axially moving flow of pressurized air to the combustor, conventional engine designs employ deswirl vanes at the compressor exit. Some more recent engine designs provide enough deswirl action to bring the compressor exit flow into the range from 0° (pure axial flow) to about 11°-12°. Of course these deswirl vanes impose a pressure loss on the compressor exit flow as well as adding complexity and cost to the engine. Other older engine designs employ a lesser deswirl action, and reduced pressure loss penalty at the deswirl vanes, and allow the axial flow of air to retain a swirl of 25° to 35°. Each of these approaches to engine design influences the design of the combustor which must best utilize the pressurized air flow (whether pure axially flowing or swirling to a degree) to combust fuel with a high efficiency. It is not conventional to save the pressure drop of deswirl vanes by doing away entirely with these vanes because the resulting air flow would swirl at about 60°, (only 30° away from pure circumferential flow), and would experience an unacceptability high pressure drop in flowing to the combustor. However, the use of a minimal deswirl action with attendant reduction in pressure drop has apparent advantages.

In view of the deficiencies of conventional combustor structures and methods for aerospace turbine engines it is an object for this invention to provide an annular combustor structure and method which will advantageously employ the naturally swirling flow resulting from the rotary dynamic air compressor of a turbine engine.

Further to the above, it is an object to provide an annular combustor structure and method which will advantageously use a swirling compressor discharge flow having a swirl angle of 25° to 35°.

Yet another object is to provide an annular combustor structure and method which provides circumferentially uniform combustion to result in a low pattern factor for the combustor.

Another object for this invention is to allow the use of a decreased number of fuel delivery nozzles, for example, in the case of small turbine engines 3 or 4 nozzles as opposed to the conventional 6 or 8, with the desirably low pattern factor being preserved.

Still another object for this invention is to provide a combustor structure and method as outlined above wherein the uniformity of combustion and low pattern factor allows a relatively low number of fuel injection nozzles to be employed with the combustor.

Further to the above, the present invention provides a combustor structure for a turbine engine, said combustor structure comprising: a pair of axially extending radially spaced annular walls which are radially congruent to cooperatively define at one end thereof an annular combustor exit; a radially extending annular dome wall interconnecting said pair of walls at the other end thereof to cooperatively bound thereabout an annular pressurized air space and to bound therewithin an annular combustion cavity: said walls cooperatively defining plural annular louvers opening therethrough for providing adjacent said combustion cavity respective annular film-like wall cooling interior air flows successively directed axially along said outer wall toward said dome wall, radially inwardly along said dome wall, and axially along said inner wall away from said dome wall: said inner wall defining a circumferential plurality of radially disposed ports opening therethrough and spaced from said dome wall to admit a respective plurality of radially outwardly directed air jets forming a torus of primary combustion air adjacent said dome wall, said torus rotating in agreement with said wall cooling film-like air flows: means for energizing said rotating torus of combustion air to swirl about said combustion cavity; and fuel delivery means for circumferentially distributing a flow of fuel into said rotating swirling torus of primary combustion air for combustion therewith.

A particular advantage of the present invention is its provision of a combustor structure for a turbine engine, which combustor has a very high level of circumferential combustion uniformity with low pattern factor even when using a comparatively low number of fuel injectors.

Yet another advantage of the present invention derives from its ability to employ a swirling flow of pressurized air from the dynamic compressor of the turbine engine. This factor allows the engine designer to decrease the extent of deswirl applied to the compressor discharge air flow, with an attendant decrease in pressure drop.

Figure 1B:
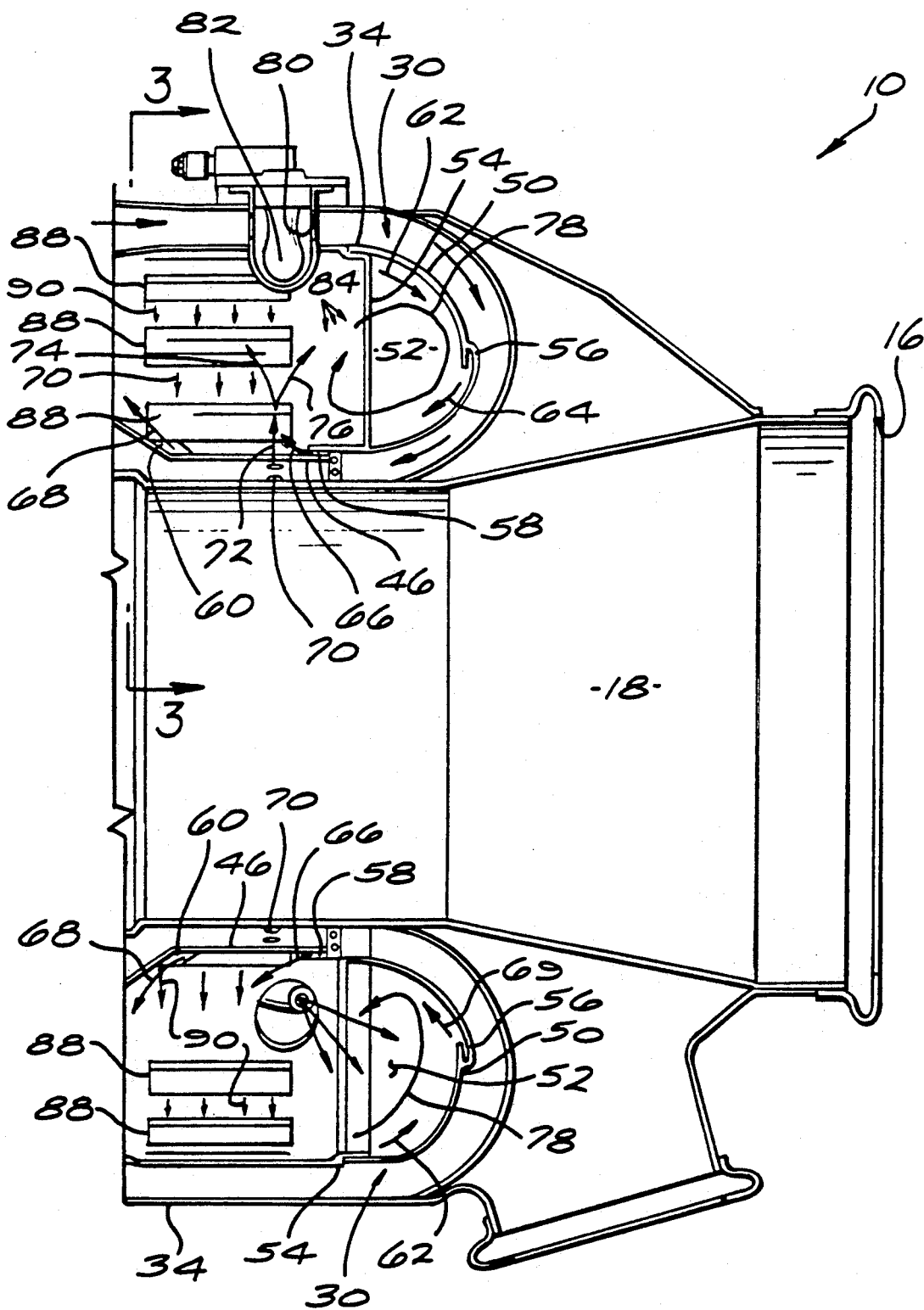
Figure 2:
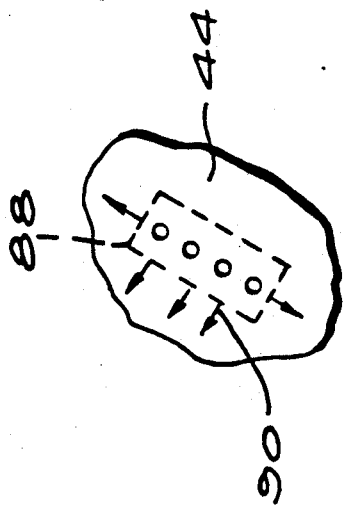
Figure 3:
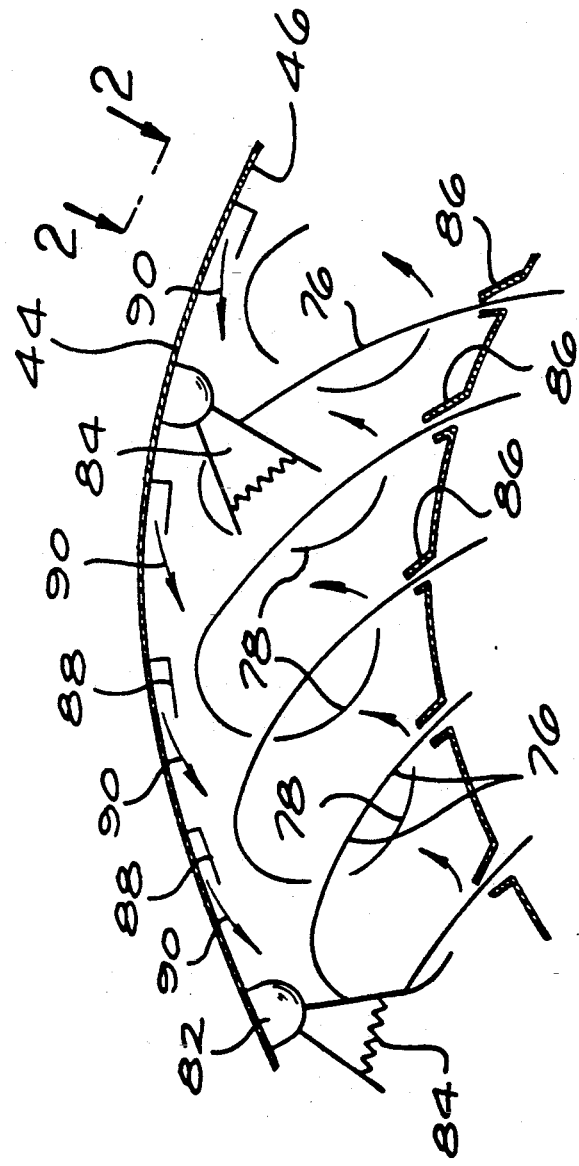

FIGS. 1a and 1b in conjunction provides a longitudinal view, partially in cross section, of a turbine engine including a combustor embodying the present invention:

FIG. 2 depicts an enlarged fragmentary cross sectional view taken along line 2—2 of FIG. 3; and FIG. 3 provides a fragmentary somewhat schematic cross-sectional view taken generally along the line 3—3 of FIG. 1.

Viewing FIGS. 1a and 1b a turbine engine 10 includes a housing 12 defining an inlet 14, an outlet 16, and a flow path, which is generally referenced with the numeral 18, extending from the inlet to the outlet. The housing 12 carries an axially spaced pair of bearings referenced with the numeral 20, by which a rotor member 22 is journaled in the flow path 18. Rotation of the rotor member 22 results in induction of ambient air through the inlet 14, as depicted by arrow 24. A compressor rotor portion 26 of the rotor member 22 pressurizes the ambient air and delivers this air swirling circumferentially to a circumferentially arrayed plurality of deswirl vanes 28. The deswirl vanes 28 allow the pressurized air downstream thereof to flow into an annular pressurized air chamber, referenced generally with the numeral 30, as is depicted by arrow 32. This air flow 32 has a swirl direction of about 25° to 35° with respect to the axial, and swirls in the same direction as rotation of rotor member 22.

Disposed in the annular pressurized air chamber 30 is an annular combustor structure generally referenced with the numeral 34. Broadly speaking, the combustor structure 34 is foraminous so that pressurized air from chamber 30 flows inwardly of the combustor and is mixed with a flow of fuel to sustain combustion. The combustion process within the combustor 34 provides a flow of pressurized high temperature combustion products, which is generally referenced with the arrow 36. These combustion products flow from the combustor 34 via an annular exit 38. Downstream of the combustor 34, the combustion products flow to a turbine rotor portion 40 of the rotor member 22. Turbine rotor portion 40 expands the combustion products 36 toward ambient and extracts mechanical shaft power therefrom. This shaft power drives the compressor rotor portion 26, as well as providing shaft power from the rotor member 22 via a shaft portion 42 thereof. Downstream of the turbine rotor portion 40, the combustion products flow from the engine 10 via the outlet 16.

Turning now to a more detailed consideration of the combustor structure 34, viewing FIGS. 1-3 in conjunction, it will be seen that the combustor includes an axially extending radially outer wall 44, an axially extending radially inner wall 46, a part 48 of which is conical to define the annular combustor outlet 38 in cooperation with a downstream portion of the outer wall 44, and an annular dome wall 50 which extends axially between the walls 44 and 46. The dome wall 50 is arcuate in longitudinal cross section to cooperate with the walls 44, 46 in defining an annular primary combustion cavity 52.

Recalling that the flow of pressurized air (arrows 32) from deswirl vanes 28 and within the chamber 30 is swirling axially along outer wall 44, around the outer surface of dome wall 50, and swirling axially along inner wall 46, it is seen that these walls define a succession of circumferentially continuous annular louvers successively designated with numerals 54, 56, 58, and 60. The louvers 54-60 provide respective axially extending film-like wall cooling air flows, which are referenced with the numerals 62-68. Each of the film-like wall cooling air flows 62-68 are in the same direction as the flow of air 32 from compressor 26 within the chamber 30.

Contributory to the air flow established within the combustor by the air flow films 62-68, the radially inner wall 46 defines a circumferentially arrayed plurality of radial ports 70 through which issues radially outwardly directed jets of pressurized air, represented by arrows 72. The air jets 72 bifurcate as they approach impingement upon the radially outer wall 44. Part of the air flow from jets 72 flows downstream in the combustion, as is represented by arrow 74. On the other hand, a significant part of the air flow of jets 72 flows into the cavity 52 as primary combustion air in a direction agreeing with the direction of film air flows 62-68, as represented by arrow 76. The air flow 76 establishes a circumferentially continuous and substantially uniform rotating toroid of air flow, represented by arrow 78, in the cavity 52.

Extending through respective apertures 80 defined by the outer wall 44, is a circumferentially spaced apart plurality of fuel injection nozzles 82. The nozzles 82 are carried on the housing 12 of the engine 10, and traverse the chamber 30. Into the toroidal air flow 78, the nozzles 82 each deliver a generally conical spray of fuel, as represented by arrows 84. The fuel spray 84 is generally circumferential in the same direction as the swirl of air flow (arrow 32) from compressor 26. However, the fuel spray 84 is not purely circumferential in direction, but is directed radially inwardly at an angle of about 45° to the tangential and axially toward the dome wall 50 at an angle in the range of 20° to 50° from the circumferential. With respect to the cone shaped fuel spray 84, angular measurements are referenced to the centerline of the cone. The result of the radially inward and axially directed angulation of the fuel spray 84 is a penetration of this fuel spray into and mixing with the rotating torus of primary air 78. Also, the angulation of the fuel spray 84 toward the dome wall 50 ensures an increased residence time for fuel particles in the combustion cavity 52. The circumferential direction of the fuel sprays 84, along with a fractional air flow which enters therewith, contributes to energizing the toroid 78 to circulate circumferentially. That is, the toroid 78 swirls in the same direction as the air flow (arrow 32) from compressor 26. Consequently, the combustion process in cavity 52 proceeds with a high degree of circumferential uniformity.

Viewing FIG. 3, it will be seen that the combustor 34 includes at the ports 70 a circumferentially arrayed plurality of circumferentially spaced and angulated nozzles 86 defined by and extending inwardly of the inner wall 46. The nozzles 86 define ports 70 through which issue air flow jets 72 radially outwardly toward the outer wall 48, and circumferentially in the same direction as the swirl of air 32 from compressor 26. As the air flow jets 72 bifurcate as they approach the outer wall 44, the jets 72 provide a downstream air flow portion 74, and a combustion cavity air flow portion 76. Importantly, the air flow portion 76 establishes the rotating toroid 78. However, the angular momentum carried by the jets 72 because of the circumferential angulation set by nozzles 86 strongly energizes the toroid 78 to swirl in the same direction as air flow 32. That is, the swirl of toroid 78 is in the same direction as the circumferential delivery of fuel sprays 84.

Further to the circumferential flow of the toroid 78 effected by the circumferential delivery of fuel sprays 84 and nozzles 86, the radially outer wall 44 carries a circumferntial array of circumferentially spaced apart louvers 88. The louvers 88 each admit to the combustor 34 a circumferentially directed film-like flow of wall cooling and dilution air, represented by arrows 90, swirling in the same direction as the toroid 78. This air flow 90 also considerably adds to the circumferential energization of the air flow within combustor 34. Consequently, combustion within the combustor 34 proceeds with both a rotation in the toroid 78, and a circumferential swirl of the entire toroid. The result is a very uniform circumferential distribution of the products of combustion flowing from exit 38.

To summarize the above, the toroid 78 strongly rotates in an axial plane, while the entire toroid swirls circumferentially around the cavity 52. That is, the air flow in cavity 52 moves in a circumferentially extending helix, as depicted in FIG. 3. The louvers 88 admit additional air 90 also in a circumferentially direction agreeing with the direction of swirl of the toroid 78, which enhances the swirl flow of air in combustor 34. Because of the high degree of circumferential uniformity of the combustion process effected by the swirling toroid of air 78, circumferentially varied dilution and wall cooling air flows are not required to correct hot spots (or to lower a high pattern factor). Consequently, overly cooled wall areas and resultant carbon fouling are not expected to be a problem with the present inventive combustor.

What is claimed is:

1. A combustor structure for a turbine engine, said combustor structure comprising:
    a pair of axially extending radially spaced annular walls which are radially congruent to cooperatively define at one end thereof an annular combustor exit;
    a radially extending annular dome wall interconnecting said pair of walls at the other end thereof to cooperatively bound thereabout an annular pressurized air space and to bound there within an annular combustion cavity;
    said walls cooperatively defining plural annular louvers opening therethrough for providing adjacent said combustion cavity respective annular film-like wall cooling interior air flows successively directed axially along said outer wall toward said dome wall, radially inwardly along said dome wall, and axially along said inner wall away from said dome wall;
    said inner wall defining a circumferential plurality of radially disposed ports opening therethrough and spaced from said dome wall to admit a respective plurality of radially outwardly directed air jets extending radially outwardly toward impingement upon said outer wall and forming a toroid of primary combustion air adjacent said dome wall, said toroid rotating in agreement with said wall cooling film-like air flows;
    means for energizing said rotating toroid of combustion air to swirl about said combustion cavity; and
    fuel delivery means for circumferentially distributing a flow of fuel into said rotating swirling toroid of primary combustion air for combustion therewith.

2. The invention of claim 1 wherein said energizing means includes a plurality of circumferentially angulated fuel delivery nozzles defining said fuel delivery means.

3. The invention of claim 2 wherein said energizing means includes a plurality of circumferentially angulated nozzles disposed respectively at said plurality of ports, said nozzles effecting a circumferential angular momentum for said outwardly directed air jets.

4. The invention of claim 3 wherein said energizing means includes the outer one of said pair of walls defining a circumferentially arrayed plurality of axially extending and circumferentially disposed louvers each directing a film-like wall cooling air flow internally along said outer wall.

5. The invention of claim 4 wherein said plurality of axially extending louvers are disposed at an upstream end thereof coextensive with said combustion cavity and said rotating toroid of primary air therein and extend axially downstream thereof toward said combustor exit.

6. The invention of claim 1 wherein said energizing means includes the radially inner one of said pair of walls defining a respective circumferentially angulated nozzle at each of said plurality of ports, said angulated nozzles effecting an angular momentum for said outwardly directed air jets, which angular momentum swirls said rotating toroid of primary combustion air.

7. The invention of claim 6 wherein said energizing means further includes the radially outer wall of said pair of walls defining a circumferentially arrayed plurality of circumferentially spaced apart axially extending louvers, each of said plurality of axially extending louvers directing a respective film-like air flow circumferentially along an inner surface of said outer wall in a direction agreeing with the swirl of said toroid of combustion air.

8. The invention of claim 7 wherein said fuel delivery means includes a circumferentially arrayed plurality of fuel nozzles each directing a spray of fuel circumferentially into said toroid of combustion air in a direction agreeing with the swirl of said toroid.

9. The invention of claim 8 wherein said fuel nozzles are each disposed proximate to said radially outer wall, said fuel spray being delivered circumferentially and radially inwardly at an angle to the tangential.

10. The invention of claim 9 wherein said angle is substantially 45°.

11. The invention of claim 8 wherein said fuel nozzles each deliver said fuel spray circumferentially and axially at an angle toward said dome wall.

12. The invention of claim 11 wherein said angle is in the range of 20° to 50° from the circumferential.

13. The invention of claim 1 wherein said energizing means includes the radially outer one of said pair of walls defining a circumferentially arrayed plurality of axially extending louvers disposed at one end thereof adjacent said combustion cavity and extending downstream thereof toward said combustor exit, each one of said plurality of axially extending louvers directing a film-like flow of air internally of said outer wall circumferentially in a single direction along an inner surface thereof, and said plurality of circumferential film-like air flows energizing said toroid of combustion air to swirl circumferentially in the same single direction.

14. A combustor structure for a turbine engine, said engine including a dynamic compressor from which issues to said combustor structure a swirling flow of pressurized air having a swirl direction, said combustor structure comprising:
    an elongate radially outer annular wall about which flows said swirling pressurized air from a first axial end to the other;
    a radially extending annular dome wall which is generally arcuate in longitudinal cross section, said dome wall joining with said radially outer wall at said other end thereof and extending radially inwardly to axially bound said swirling flow of pressurized air as the latter flows radially inwardly about said combustor structure;
    a radially inner annular wall spaced radially from said outer wall in radially congruence therewith, said inner wall joining with said dome wall at a radially inner extent thereof and radially outwardly bounding said swirling pressurized air as the latter flows axially inwardly of said inner wall towards said first axial end of said combustor structure;

said walls cooperating to bound an annular combustion cavity proximate to said dome wall, to define an annular exit at said first combustor end, and to define proximate said combustion cavity annular louver means opening therethrough for providing internal film-like flows of pressurized air flowing in sequence axially along the inner surface of said outer wall, radially inwardly along said dome wall, and axially toward said exit along said inner wall;

said inner wall defining a circumferentially arrayed plurality of radially disposed ports spaced axially from said dome wall and from which issue radially extending jets of pressurized air, said radially extending air jets issuing generally normal to said outer wall to be bifurcated upon approaching said outer wall to define in said combustion cavity a rotating toroid of primary combustion air;

a plurality of radially inwardly extending fuel injection nozzles projecting inwardly of said outer wall through a respective plurality of apertures defined thereby generally in axial congruence with said plurality of ports, each of said plurality of nozzles delivering in said swirl direction a circumferential spray of fuel directed also radially inwardly and axially toward said dome wall; and said outer wall defining a circumferentially arrayed and spaced apart plurality of axially extending louvers providing respective circumferential film-like flows of pressurized air extending axially form proximate said combustion cavity toward said combustor exit, whereby said rotating toroid of combustion air is energized to swirl in said swirl direction by said fuel sprays and circumferential film-like air flows.

15. The invention of claim 14 wherein said inner wall further defines a plurality of circumferentially angulated nozzles disposed each at a respective one of said plurality of ports, said nozzles effecting a circumferential annular momentum for said air jets in said swirl direction to additionally energize swirly of said toroid of combustion air.

16. A method of carrying out combustion for a combustion turbine engine having a rotary dynamic compressor providing a flow of pressurized air having a swirl direction, said method including the steps of:

forming a singular rotating toroid of said pressurized air;

swirling said toroid in said swirl direction;

delivering a flow of fuel circumferentially in said swirl direction into said rotating and swirling toroid of pressurized air for mixture therewith;

combusting said mixed fuel and pressurized air in said rotating and swirling toroid;

wherein said step of swirling said rotating toroid in said swirl direction includes admitting to said toroid a circumferentially arrayed plurality of pressurized air flows each directed circumferentially in said swirl direction;

wherein said plurality of air flows are each axially elongated and film-like; and wherein said step of forming said rotating toroid of pressurized air includes the steps of combining a succession of annular film-like air flows into said toroid, and also combining into said toroid a circumferentially arrayed plurality of pressurized air jets flowing radially outwardly and axially into said toroid.

17. The method of claim 16 additionally including the step of flowing said plurality of air jets also circumferentially in addition to radially outwardly and axially into said toroid thereby to add angular momentum in said swirl direction.

* * * * *